Feb. 1, 1966    F. R. WILSON    3,232,145
HAND REAMER
Filed Oct. 17, 1963    2 Sheets-Sheet 1

INVENTOR.
FRANK R. WILSON
BY
Des Jardins, Robinson, Trillo & Schank
ATTORNEYS

Feb. 1, 1966  F. R. WILSON  3,232,145
HAND REAMER
Filed Oct. 17, 1963  2 Sheets-Sheet 2
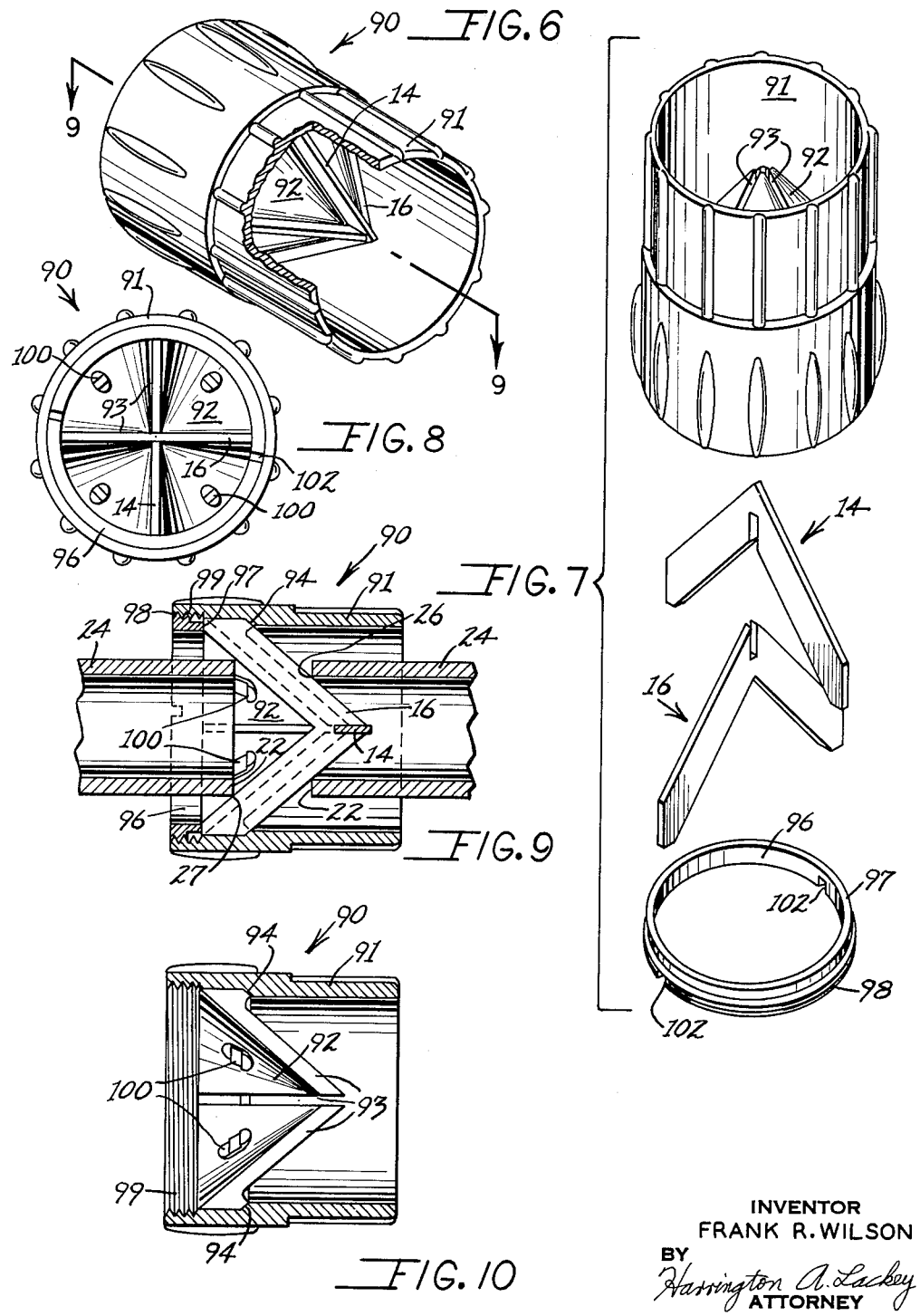
INVENTOR
FRANK R. WILSON
BY
Harrington A. Lackey
ATTORNEY United States Patent Office 3,232,145
Patented Feb. 1, 1966

3,232,145
HAND REAMER
Frank R. Wilson, Memphis, Tenn., assignor to Parker-Hannifin Corporation, Cleveland, Ohio, a corporation of Ohio
Filed Oct. 17, 1963, Ser. No. 317,407
11 Claims. (Cl. 77—73)

This is a continuation-in-part of patent application S.N. 90,366, filed February 20, 1961, now abandoned.

This invention relates to an improved reamer, and more particularly to a hand reamer having removable blades.

Heretofore, a reamer for deburring cut ends of hollow pipes and other tubular members normally comprised a cylindrical housing having a blade supporting means cast integrally into one end of the housing. The reamer blades were rigidly secured to the supporting means and were disposed in the housing defining conical cutting surfaces.

The present invention is directed to a reamer adapted to deburr both inner and outer surfaces of the cut end of a hollow pipe by telescoping the open end of the housing over the cut end of the pipe, whereby the apex of the conically disposed blades enters the pipe so that the blades bear against the inside peripheral wall of the pipe at its cut end. Thereafter, the reamer is forced toward the pipe and simultaneously rotated so that the rotating blades cut the burrs and bevel the internal peripheral edge of the end of the pipe. The reamer is then reversed and the cut end of the pipe is inserted into the opposite end of the reamer so that the conical blades bear against the outside peripheral edge of the pipe end. By forcing and rotating the reamer toward the pipe, the outside peripheral edge of the pipe end will also be deburred and beveled.

It has been found that in prior reamers where the blades and housings are constructed as integral units, the entire reamer must be replaced when the blades become worn or damaged. Furthermore, because the blades are disposed inside the housing, it is difficut and time consuming to sharpen the blades when they become dull or chipped.

It is therefore an object of this invention to overcome the disadvantages enumerated by providing a novel reamer, particularly adapted for manual use, and having blades arranged to deburr and cut both the external and internal peripheral edges of the end of a pipe.

One object of this invention is to provide a reamer having novel detachably secured elements for easily removing the blades.

Another object of this invention is to provide a reamer having a novel blade supporting means with slots for slidably receiving the blades for ready removal of the blades from the reamer.

Another object of this invention is to provide a reamer having blade supporting means having slots for receiving the blades, and front and rear separable shoulder means for detachably securing the blades in the slots.

A further object of this invention is to provide an improved reamer having novel detachable elements which are simple and inexpensive to manufacture.

Further objects and advantages of the invention will be apparent from the following description, taken in conjunction with the drawings, wherein:

FIG. 5 is a fragmentary view similar to FIG. 3 illustrating a modification of the invention;

FIG. 6 is a view similar to FIG. 1, illustrating another modification of the invention;

FIG. 7 is an exploded perspective view illustrating the invention disclosed in FIG. 6;

FIG. 8 is a rear end view of the invention disclosed in FIG. 6;

FIG. 9 is a section taken along line 9—9 of FIG. 6, illustrating the operation of the invention upon the internal and external peripheral edges of the end of a pipe; and FIG. 10 is a view similar to FIG. 9 with the blades and the rear shoulder ring removed.

Although this invention is described in terms of a hand reamer, it will be understood that it can be utilized in power tools if desired.

Figure 1:
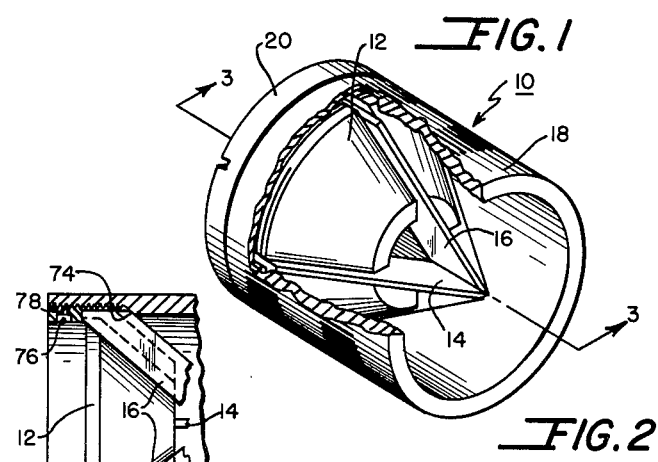
FIG. 1 is a perspective view, partially broken away, illustrating one embodiment of this invention.

Referring now to FIG. 1, the improved hand reamer 10 comprises a blade supporting means 12, a plurality of V-shaped blades 14 and 16, a cylindrical housing 18, and a restraining collar 20.

Figure 3:
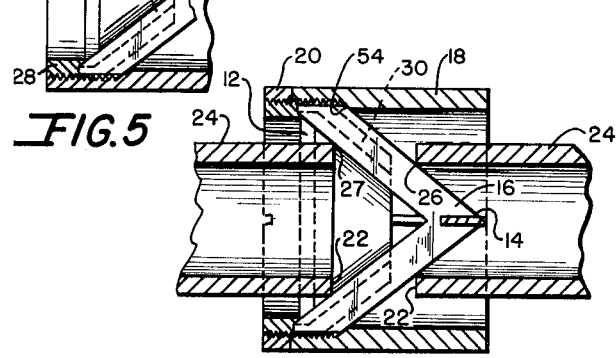
FIG. 3 is a section taken along the line 3—3 of FIG. 1, disclosing the operation of the invention upon the internal and external peripheral edges of the end of a pipe.

As illustrated in FIGS. 1 and 3, the V-shaped blades 14 and 16 cooperate together to define substantially conical inner and outer cutting surfaces disposed within the hollow housing 18 so that the reamer 10 can be utilized to deburr both inner and outer peripheral edges of a cut end 22 of a hollow pipe 24, or other tubular member.

For example, as illustrated in FIG. 3, the reamer 10 is adapted to have the open front end of the housing 18 telescoped over a newly cut end 22 of a hollow pipe or conduit 24, with the outer cutting edges of the blades 14 and 16 bearing aginst the internal peripheral edge 26 of the pipe end 22. When the reamer 10 is forced toward the pipe 24 and simultaneously rotated, either clockwise or counter-clockwise, the blades 14 and 16 completely cut away any burrs projecting from the internal peripheral edge 26.

When the pipe end 22 is inserted into the opposite or rear end of the housing 18 the inner or rear cutting edges of blades 14 and 16 will bear against the external peripheral edge 27 of the pipe end 22. When the reamer is again forced toward the pipe 24 and rotated, the blades 14 and 16 will cut away any burrs projecting from the external peripheral edge 27, as disclosed in FIG. 3.

Since continued use of the reamer will eventually wear away, chip or dull the blades 14 and 16, this invention contemplates an assembly of easily detachable elements within the reamer to facilitate removal and replacement of the blades.

Figure 2:
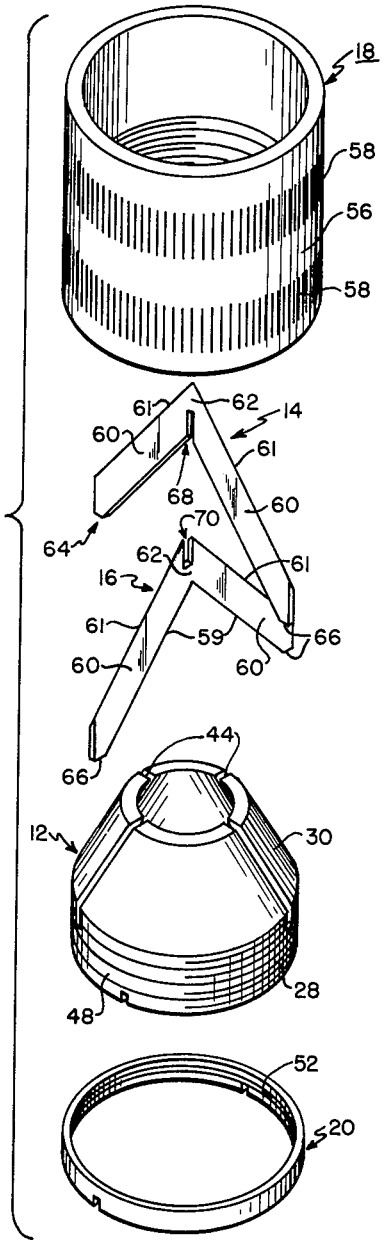
FIG. 2 is an exploded perspective view illustrating the invention disclosed in FIG. 1.

As illustrated in FIGS. 1, 2 and 3, the blade supporting means 12 is preferably formed of metal and has a cylindrical portion 28 and a frusto-conical portion 30 extending from one end of the cylindrical portion 28. The conical portion 30 has an internal peripheral surface 32 joining the internal peripheral surface 34 of the cylindrical portion 28 at an angle.

In the modification disclosed in FIGS. 1–4, a shoulder means 36 having a rear end 38 is integrally connected to the cylindrical portion 28 of the blade-supporting means 12. The shoulder means 36 is cut away at 40 adjacent the surface 34 to define a slanting blade supporting surface 42.

The conical portion 30 and the cylindrical portion 28 of the blade supporting means 12 include circumferentially spaced slots 44 to receive the blades 14 and 16. Slots 44 terminate in the cylindrical portion 28 to define shoulders or surfaces 46 in the shoulder means 36. The surfaces 46 and 42 cooperate together to provide shoulders for supporting the rear end of each of the blades 14 and 16. However, it will be understood that the surface 42 and its supporting portion of the shoulder means 36 may be eliminated, if desired, since it has been found that the shoulder 46 is sufficient to support the rear ends of the blades 14 and 16.

The outer peripheral surface of the cylindrical portion 28 of the blade supporting means 12 and the shoulder means 36 is externally threaded at 48 to cooperate with internal threads 50 and 52, respectively, in the housing 18 and the collar 20.

Figure 4:
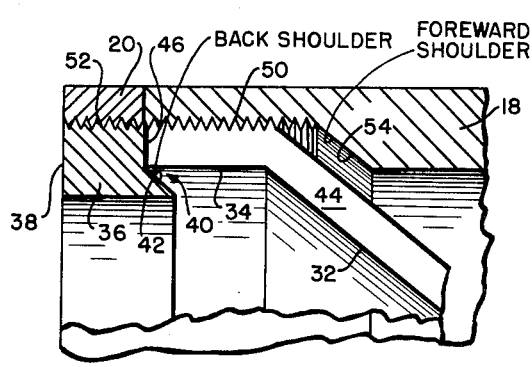
FIG. 4 is an enlarged fragmentary sectional elevation of the invention disclosed in FIG. 3, with the blades removed.

As illustrated in FIG. 4, a forward shoulder 54, is formed on the internal surface of the wall of the cylindrical housing 18 and tapers outwardly and rearwardly to join the threaded portion 50 and engage the forward edge portions of the blades 14 and 16 in the manner illustrated in FIG. 3.

If desired, the external peripheral surface 56 of the housing 18 can be knurled at 58 to facilitate ease in rotating the housing relative to the blade supporting means 12 and the rear shoulder means 36 during attachment or separation of the housing 18 with the shoulder means 36.

The blades 14 and 16, as illustrated in FIG. 2, are respectively cut from flat sheets of case hardened metal, and are substantially V-shaped. Each blade 14 and 16 has a pair of legs 60 joined together at their forward ends to define an apex 62. The rear or free ends of the blades 14 and 16 are cut away at 64 to define flat surfaces 66 engageable with rear shoulder 46. The apex portion 62 of the blade 14 is provided with a rearwardly directed slot 68 to receive the forwardly directed slot 70 in the apex portion 62 of the blade 16, as illustrated in FIG. 2. With the slots 68 and 70 interengaged, blades 14 and 16 are relatively locked together to define the inner and outer conical cutting surfaces illustrated in FIGS. 1 and 3. The blade edges 59 and 61, respectively, may be beveled for sharpness if desired.

If desired, the slots 68 and 70 of the respective blades 14 and 16 can be cut at other angles than the disclosed right angles to dispose the blades at correspondingly different angles. The slots 44 in the blade supporting means 12 would also have to be cut at correspondingly different angles in order to accommodate the blades 14 and 16.

The assembled blades 14 and 16 are adapted to have their respective legs 60 received in the slots 44 in a manner illustrated in FIGS. 1 and 3, so that the ends 66 abut against the surface 46, with the adjoining inner edges of the blades 14 and 16 abutting against the surface 42. The major length of the legs 60 of the blades 14 and 16 are supported by the conical portion 30, as illustrated in FIG. 3, for rotation with the reamer 10.

After the blades 14 and 16 have been assembled in the blade supporting means 12, the hollow housing 18 is telescoped over the blade supporting means 12 and threaded thereto through the cooperation of the threads 50 and 48. The housing 18 is backed onto the blade supporting means 12 until the shoulder 54 engages the forward edges of the blades 14 and 16 in a manner illustrated in FIG. 3. Thus, the forward shoulder 54 cooperates with the rear shoulders 42 and 46 to hold the blades 14 and 16 stationary within the reamer 10. The collar 20 is then threaded over the rear shoulder means 36 by means of the threads 52 and 48 to the position illustrated in FIGS. 1, 3 and 4, in order to hold the housing 18 in a fixed position relative to the blade supporting means 12 and the shoulder means 36. The reamer 10 is now assembled for operation upon the internal or external peripheral edges of the pipe end 22.

When it is desired to change the blades 16 and 14, the collar 20 is counter-rotated away from the housing 18, and then the housing 18 is counter-rotated forward until it completely disengages the shoulder means 36 and the blade supporting means 12. Then the blades 14 and 16 may be easily removed from their corresponding slots 44, sharpened and restored, or completely replaced by new blades.

If desired, the collar 20 can be eliminated in the manner illustrated in FIG. 5, whereby the housing 72 is adapted to completely cover the cylindrical portion 28 of the blade supporting means 12 and the shoulder means 36, when the forward shoulder 74 of housing 72 abuts against the forward edges of the blades 14 and 16 in the same manner as the housing 18 previously described.

A counter-sunk set screw 76 is carried by the rear shoulder means 36 and is threadedly disposed in a bore 78 passing transversely through the shoulder means 36. The set screw 76 has a sharp outer end and, when tightened against the internal peripheral surface of the housing 72 disposed in the position illustrated in FIG. 5, bears against the housing 72 to hold it in a fixed position relative to the rear shoulder means 36. By loosening the set screw 76 housing 72 may be un-threaded from the rear shoulder means 36 and blade supporting means 12 to separate them and remove the blades 14 and 16.

Referring now to the modification disclosed in FIGS. 6–10, the reamer 90 comprises a cylindrical housing 91, having a conical blade supporting means 92 fixed integrally within the housing 91 by casting or any other convenient means. The blade supporting means 92 is provided with slots 93 identical to the slots 44 for receiving the V-shaped blades 14 and 16. The housing 91 cooperates with the blade supporting means 92 to form the front or forward shoulder 94 formed or chamfered in the same way as the shoulders 54 and 74 in order to engage the forward edges and limit the forward movement of the blades 14 and 16.

In this modification (FIGS. 6–10), the rear shoulder means 96 comprises an annular ring adapted to be detachably inserted within the rear portion of the housing 91 so that its front face 97 will form a shoulder to abut flush against the rear end of each of the blades 14 and 16. The ring 96 comprises external threads 98 for threadedly engaging the internal threads 99 in the rear portion of the housing 91. The dimensions of the rear portion of the housing 91 and the ring 96 are such that when the ring 98 has been unthreaded and completely removed from inside the housing 91, the blades 14 and 16 may be easily removed from their slots 93 from the rear of the blade supporting means 92 and withdrawn through the rear end of the housing 91.

To assemble the reamer 90, the blades 14 and 16 are inserted through the rear end and within the housing 91 and into their corresponding slots 93 of the supporting means 92. When the blades 14 and 16 have been thrust forward in their slots 93 until they engage the forward shoulder 94, the rear shoulder means, or annular ring 96 is then thrust into the rear end of housing 91 and rotated to threadedly engage the threads 90 and 99, until the front face or shoulder 97 abuts flush against the rear ends of the blades 14 and 16. The reamer 90 is then fully assembled without further manipulation.

FIG. 9 shows how the reamer 90 is adapted to deburr the internal peripheral edge 26 and the external peripheral edge 27 of the cut end 22 of the pipe 24, in the same manner as the reamers 10 and 80.

The stepped members 100 are formed in the rear surfaces of the conical blade supporting means 92 as means for limiting the forward thrust of a pipe end 22 so that its external peripheral edge 27 will not be chamfered or flared beyond a certain limit.

The aligned notches 102 in the rear shoulder ring 96 are provided merely for receiving a wide screw driver blade or other similar tool for facilitating the threading and unthreading of the ring 96 within the rear portion of the housing 91.

It will be apparent to those skilled in the art that various changes may be made in the invention without departing from the spirit and scope thereof, and therefore the invention is not limited by that which is disclosed in the specifications or shown in the drawings, but only as indicated in the appended claims.

What is claimed is:

1. A reamer comprising:
   (a) a blade supporting means,
   (b) a plurality of converging blades having merging ends secured together,
   (c) a plurality of slots in said blade supporting means for receiving of said blades, respectively,
   (d) a hollow housing encompassing said supporting means,
   (e) a first internal shoulder means formed in said housing for engaging said blades in said slots to prevent the movement of said blades beyond said first shoulder means,
   (f) a second internal shoulder means within said housing spaced from said first shoulder means to prevent the movement of said blades beyond said second shoulder means, and
   (g) means for detachably coupling said second shoulder means to said housing to removably retain said blades in said slots between said first and second shoulder means.

2. The invention according to claim 1 in which said blade supporting means is integral with said housing and said coupling means comprise first coupling means within said housing and second coupling means on said second shoulder means for detachably engaging said first coupling means.

3. The invention according to claim 2 in which said first coupling means comprises internal threads formed in said housing and said second coupling means comprises external threads for engaging said internal threads.

4. The invention according to claim 1 in which said second shoulder means is integral with said blade supporting means, and said detachable coupling means comprise first coupling means within said housing and second coupling means on said second shoulder means for detachably engaging said first coupling means.

5. The invention according to claim 4 in which said first coupling means comprises internal threads formed in said housing; and said second coupling means comprises external threads formed on said second shoulder means for engaging said internal threads.

6. A reamer comprising:
   (a) a substantially cylindrical housing having a front end, a rear end and a longitudinal axis,
   (b) a conical blade supporting means within said housing tapered forward and having a plurality of blade-receiving slots,
   (c) a blade received in each slot, said blades converging forward and having merging ends secured together,
   (d) forward shoulder means formed in said housing to engage and limit the forward movement of said blades,
   (e) rear shoulder means within said housing behind said slots for engaging and limiting the rearward movement of said blades,
   (f) first coupling means on said housing,
   (g) second coupling means on said rear shoulder means for detachably engaging said first coupling means to removably retain said blades in said slots between said first and second shoulder means.

7. The invention according to claim 6 in which said rear shoulder means is annular.

8. The invention according to claim 7 in which said blade supporting means is integral with said housing.

9. The invention according to claim 7 in which said annular rear shoulder means is integral with said blade supporting means.

10. The invention according to claim 6 in which said forward shoulder means comprises an annular-chamfered surface formed on the inside of the wall of said cylindrical housing and sloping at substantially the same angle as the forward edges of said blades for engaging the same.

11. The invention according to claim 6 in which said first coupling means comprises internal threads and said second coupling means comprises external threads for threadedly engaging said internal threads.

References Cited by the Examiner

UNITED STATES PATENTS

| | | | |
|---|---|---|---|
| 1,228,951 | 6/1917 | Morton | 77—73 |
| 1,255,304 | 2/1918 | Gairing | 29—105 |
| 2,242,821 | 5/1941 | Fanslow | 77—73 |

WILLIAM W. DYER, JR., *Primary Examiner.*